United States Patent [19]
Simmons et al.

[11] 3,765,096
[45] Oct. 16, 1973

[54] MASON'S GUIDELINE HOLDERS

[75] Inventors: William G. Simmons, Walpole; Lawrence A. Caprio, Whitman, both of Mass.

[73] Assignee: Louis M. Gerson Co., Inc., Middleboro, Mass.

[22] Filed: Mar. 17, 1972

[21] Appl. No.: 235,642

[52] U.S. Cl. .................................................. 33/86
[51] Int. Cl. ............................................. E04g 21/18
[58] Field of Search ................................... 33/85, 86

[56] References Cited
UNITED STATES PATENTS
3,200,500   8/1965   Stone ..................................... 33/85
3,408,742   11/1968  Caprio et al. ......................... 33/85

Primary Examiner—Louis R. Prince
Assistant Examiner—Charles E. Phillips
Attorney—Stanley Sacks et al.

[57] ABSTRACT

A mason's guideline holder is formed of a generally L-shaped hollow plastic body which has first and second opposed side walls each having an axially extending portion and an upwardly extending portion to define first and second joining surfaces angularly arranged with respect to each other. A transverse front wall extends between the side walls and carries an interlocking means with a transverse wall at the second joining surface carrying a mating interlocking means so that the guideline holder can be interlocked with an identical guideline holder to form a convenient rectangular carrying unit. At least two of the transverse walls are parallel to each other so that the mason's guideline holder can be molded in a simple injection molding operation.

7 Claims, 3 Drawing Figures

PATENTED OCT 16 1973 3,765,096

MASON'S GUIDELINE HOLDERS

BACKGROUND OF THE INVENTION

Mason's guideline holders and their uses are well-known in the art as disclosed in U.S. Pat. No. 3,408,742 and other patents referred to therein. Such devices are generally L-shaped elements adapted to engage at opposite ends of brick walls and the like during the building thereof. They are provided with means for retaining a mason's guideline in a taut and level position to assist the mason in laying of bricks and the like in a proper linear fashion. Ordinarily, these guideline holders are used in pairs. It has become common practice for building supply companies and other suppliers to provide these guideline holders to masons for advertising purposes.

Plastic materials have been used in the past as disclosed in the aforementioned patent to form mating pairs which interlock to simplify packaging and carrying. However, such holders or blocks often require the use of complex molding techniques such as the use of cam operated molds in order to obtain the desired shapes. Interlocking devices used are often complex and printing problems are sometimes encountered in printing over mold joining lines on conventional plastic mason's blocks.

SUMMARY OF THE INVENTION

It is an object of this invention to provide simple and efficient mason's guideline holders which are capable of being interlocked in pairs.

Another object of this invention is to provide a mason's guideline holder in accordance with the preceding object which is rapidly and efficiently produced by conventional plastic molding procedures.

Still another object of this invention is to provide a mason's guideline holder in accordance with the preceding objects which permits ease of printing of advertising and informational material.

According to the invention, a mason's guideline holder is constructed and arranged to interlock with an identical holder. The mason's guideline holder has a generally L-shaped plastic body with first and second opposed side walls, each having an axially extending portion and an upwardly extending portion to define a first joining surface and a second joining surface angularly arranged with respect to said first joining surface. A transverse front wall extends between the side walls and carries a first interlocking means. A transverse wall is positioned at the second joining surface and carries a second interlocking means for mating with the first interlocking means of an identical mason's guideline holder. An intermediate transverse wall extends between the side walls and is parallel with at least one of the front wall and the transverse wall at the second joining surface so that the guideline holder can be molded in a simple injection mold without the need for cam operated molds. A plurality of aligned guideline receiving apertures are defined by the front wall, transverse wall and intermediate transverse wall.

In the preferred embodiment, a bottom wall is provided which can be imprinted with suitable advertising or informational materials. Preferably the interlocking means used are simple tongue and groove arrangements.

Because of the parallel arrangement of the transverse walls, cam operated molds need not be used and a simple conventional injection mold can be used with a parting line along the side walls of the device. Thus, production costs can be reduced.

DESCRIPTION OF PREFERRED EMBODIMENTS

Figure 1:
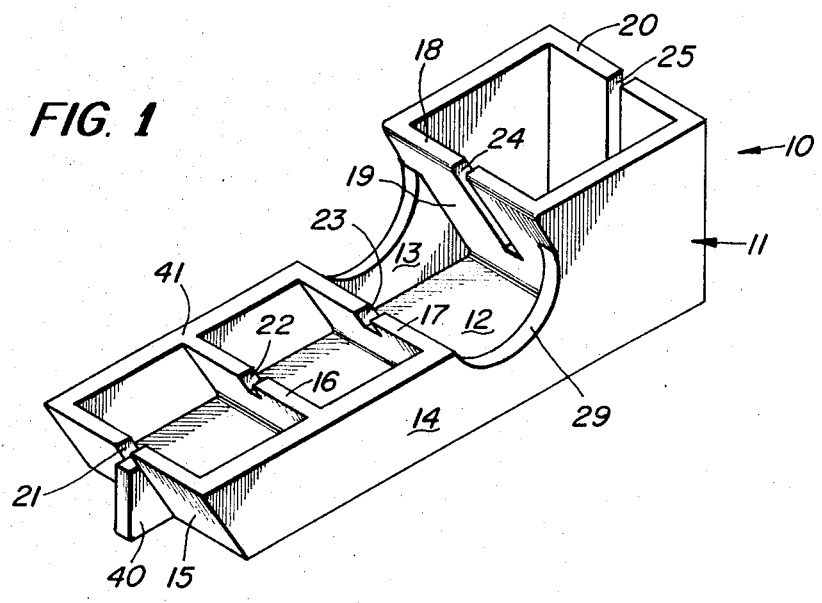
FIG. 1 is a perspective view of a single mason's guideline holder embodying the present invention.
Figure 2:
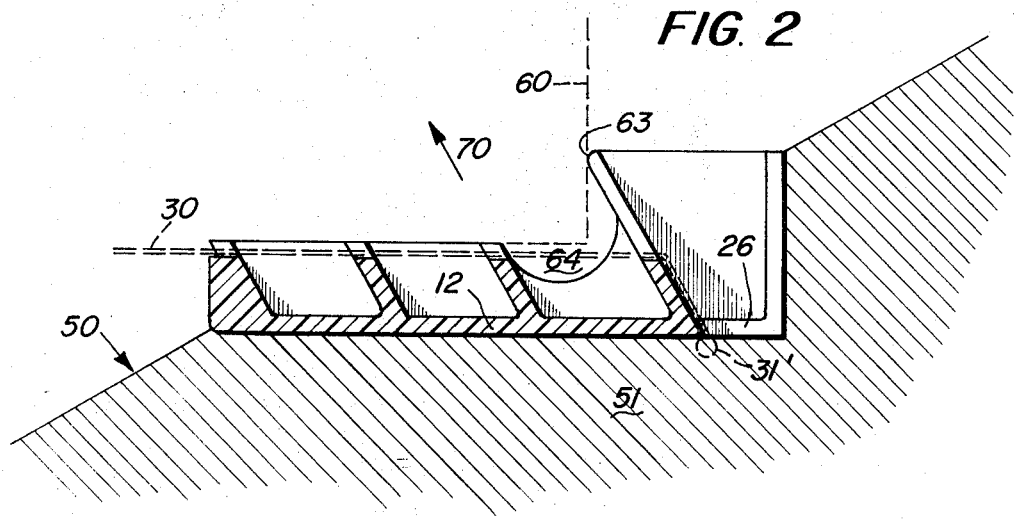
FIG. 2 is a cross sectional view thereof taken along line 2—2 of FIG. 1.

With reference now to the drawings and more particularly FIGS. 1 and 2, a preferred embodiment of a mason's guideline holder is illustrated generally at 10 and has a body 11 formed as an integral piece of a suitable plastic material such as for example impact polystyrene, acrylate polymers or polystyrene preferably having some small degree of resilience, yet, being sufficiently rigid to maintain a substantially constant configuration in use.

The body 11 is preferably generally L-shaped and molded as a single unit.

Figure 3:
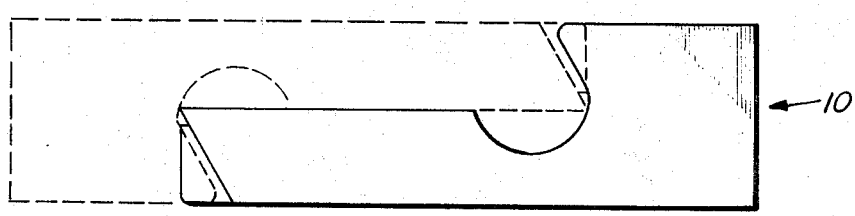
FIG. 3 is a side view thereof with a second identical mason's guideline holder shown in dotted outline and in the nested position of two identical holders.

The body 11 has a preferably substantially flat base or bottom wall 12 with opposed side walls 13 and 14 preferably parallel to each other and extending upwardly from the base at an angle of 90° therewith. Each side wall has an axially extending lower portion forming the long part of the L-shape with an upwardly extending portion forming the short segment of the L shape. A curved edge 29 is provided on each side wall at the junction between each wall portion. As best shown in FIG. 3, the curved edges enable the finger of a user to reach in and separate two nested holders.

A front wall 15 joins the side walls and extends transversely therebetween. Intermediate transverse walls 16 and 17 extend between the side walls 13 and 14 along with transverse wall 18 which defines a joining area 19 as will be described. A rear or closure wall 20 closes the rear end of the mason's block and extends upwardly from the base 12 at a 90° angle. Guideline notches 21, 22, 23, 24 and 25 are provided in walls 15, 16, 17, 18 and 20 respectively. Notch 25 joins with a notch 26 in the base as best shown in FIG. 2.

The curved edges 29 provide for essentially point contact with one wall of a brick corner shown at 60 in FIG. 2. Thus, the square corner 60 has one wall for mounting the block 10 by engagement with a line of points at edge 63 of wall 18. This structure prevents any irregularity in the squareness or surface plane of the corner from obstructing mounting of the block since a clear area 64 is present in the block and the apex of the angle corner does not engage the block.

As best shown in FIG. 2, a string 30 is mounted in the mason's guideline holder by knotting one end 31 and passing the string or line through the notches 26, 25, 24, 23, 22 and 21 outwardly to a second identical holder mounted at another end of a brick wall being built in accordance with conventional practice. The notches provide for supporting and holding the line taut as is known in the art.

Notch 24 has a second function in that it also acts as one part of an interlocking means for interlocking the mason's guideline holder 10 with an identical mason's guideline holder.

The interlocking of two identical holders is best shown in FIG. 3. Front wall 15 carries an outwardly extending flange 40 dimensioned to be tightly received in notch 24. Thus, the width of flange 40 is slightly greater than the width of notch 24. Due to the slight resiliency of the plastic, the flange can be compacted somewhat and forced into holding engagement with a notch 24 of another identical block. The walls 13, 14, 15, 16 and 17 have top edges which define a surface 41 for joining the blocks together as shown in FIG. 3 with a surface or area 19 acting as a second joining area or surface. Thus, as shown in FIG. 3, two identical holders are arranged in the position shown, with surfaces 41 of each in contact and the blocks then slid inwardly toward each other until each of the flanges 40 engage and are gripped by each of the notches 24. This interlock enables the blocks to be carried easily in convenient pairs. Preferably the blocks are dimensioned to provide a substantially rectangular outer configuration when nested for ease and convenience of storing and carrying.

It is a feature of this invention that walls 15–18 are all parallel to each other and angularly arranged with the base at an angle of from preferably 50° to 75° (as for example 60°) which permits molding in a conventional two-part mold without the use of cams.

These parallel walls 15–18 form between them and the bottom wall 12 a series of unobstructed pockets, whose dimensions at their tops are at least as great as their dimensions adjacent the bottom wall 12 Thus, when a mold part line at 50 is used, since these walls are parallel to each other, the part can be removed from the mold in a simple molding procedure without the use of cams. One cavity block is illustrated at 51 with a corresponding mating block capable of separating in the direction of arrow 70.

The flat base 12 provides a lower surface which is unobstructed thereby simplifying printing on the flat base without obstruction by mold part lines and the like since the part line would be along line 50.

The dimension of the guideline holder can vary as known in the art although in the preferred embodiment the over-all front to back dimension is 4 inches with a width of 1¼ inch and a height at the upstanding portion of the side wall of 1¼ inch. Wall thicknesses of three thirty-seconds to five thirty-seconds inch are used. Preferably the body is substantially hollow as shown although parts could be filled in if desired for additional strength.

Although a specific embodiment of the present invention has been shown and described above, many variations are possible. For example, in some cases, walls 16 and 17 could be eliminated as could wall 20. In all cases, at least two of the transverse walls used are parallel to each other and preferably extend up from the base at an angle of less than 90° with the base.

What is claimed is:

1. A mason's guideline holder constructed and arranged to interlock with an identical mason's guideline holder, said first-mentioned mason's guideline holder having an integral plastic body in generally an L shape and comprising, a base wall, first and second opposed generally L-shaped side walls joined to and extending upwardly from said base wall, each of said side walls having an axially extending lower portion forming a long part of the L shape and an upwardly extending portion forming a short segment of the L shape with a cut away section at an area where the long part meets the short segment, a transverse front wall extending upwardly from said base wall, between said side walls and carrying an outwardly extending tongue interlocking means, a transverse wall at said cut away area carrying a notch interlocking means for mating with said tongue interlocking means of said identical mason's guideline holder, an intermediate transverse wall extending upwardly from said base wall and parallel with at least one of said front wall and said first-mentioned transverse wall so that said guideline holder can be molded in a simple injection mold without the need for injection molding cams, said side walls, front wall and first-mentioned intermediate wall defining a first joining surface, and pockets formed by said walls having dimensions at their tops which are at least as great as their dimensions adjacent said base wall, and a plurality of aligned guideline receiving apertures defined by and extending from top edges of said front wall, transverse wall and intermediate transverse wall for mounting a guideline.

2. A mason's guideline holder in accordance with claim 1 and further comprising said base wall being perpendicular to said side walls.

3. A mason's guideline holder in accordance with claim 2 wherein said body further includes a notched rear wall extending upwardly from said base wall and between said side walls.

4. A mason's guideline holder in accordance with claim 3 wherein a plurality of said intermediate transverse walls are provided parallel with each other and each joining said base wall at an acute angle thereto.

5. A mason's guideline holder in accordance with claim 1 wherein each of said side wall cutout sections are dimensioned to receive a square corner therein with said corner being engaged by points of said transverse wall with one portion of the corner abutting said first joining surface and a second portion of the corner at a right angle to said one portion of the corner abutting a second of said first-mentioned transverse wall.

6. A mason's guideline holder in accordance with claim 5 wherein said cutout sections are each defined by curved edges dimensioned to be spaced from an apex of said square corner when said holder is in use.

7. A mason's guideline holder in accordance with claim 6 wherein said front wall, transverse wall and intermediate transverse wall are parallel to each other and extend upwardly from said base wall at an angle of from 50° to 75°.

* * * * *